US006751863B2

(12) United States Patent
Tefft

(10) Patent No.: US 6,751,863 B2
(45) Date of Patent: Jun. 22, 2004

(54) METHOD FOR PROVIDING A ROTATING STRUCTURE HAVING A WIRE-ARC-SPRAYED ALUMINUM BRONZE PROTECTIVE COATING THEREON

(75) Inventor: Stephen Wayne Tefft, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 144 days.

(21) Appl. No.: 10/141,573

(22) Filed: May 7, 2002

(65) Prior Publication Data

US 2003/0208904 A1 Nov. 13, 2003

(51) Int. Cl.[7] .................................................. B23P 15/00

(52) U.S. Cl. ...................... 29/889.21; 29/458; 427/449; 219/121.47; 416/219 R; 416/241 R

(58) Field of Search ......................... 29/889.21, 889.22, 29/458; 219/121.47, 121.53, 121.59, 121.36; 416/219 R, 241 R, 220 R, 204 A; 427/449, 455, 456, 580, 576

(56) References Cited

U.S. PATENT DOCUMENTS

| | | | | |
|---|---|---|---|---|
| 4,526,839 A | * | 7/1985 | Herman et al. | 428/550 |
| 4,600,479 A | | 7/1986 | Thoma et al. | |
| 4,741,974 A | * | 5/1988 | Longo et al. | 428/558 |
| 5,019,429 A | * | 5/1991 | Moskowitz et al. | 427/422 |
| 5,294,462 A | * | 3/1994 | Kaiser et al. | 427/446 |
| 5,312,696 A | | 5/1994 | Beers et al. | |
| 5,580,669 A | | 12/1996 | Beers et al. | |
| 5,791,560 A | * | 8/1998 | Rogers et al. | 239/8 |
| 5,808,270 A | | 9/1998 | Marantz et al. | |
| 5,820,939 A | * | 10/1998 | Popoola et al. | 427/449 |
| 5,958,520 A | | 9/1999 | Cook et al. | |
| 5,976,704 A | * | 11/1999 | McCune | 428/469 |
| 6,001,426 A | * | 12/1999 | Witherspoon et al. | 427/449 |
| 6,089,828 A | | 7/2000 | Hollis et al. | |

FOREIGN PATENT DOCUMENTS

JP 63219563 * 9/1988

* cited by examiner

*Primary Examiner*—I Cuda-Rosenbaum
(74) *Attorney, Agent, or Firm*—Gregory O. Garmong; Kurt L. Ehresman; McNees Wallace & Nurick LLC

(57) ABSTRACT

A rotating structure of a gas turbine engine is provided by furnishing a rotor disk comprising a hub with a plurality of hub slots in a periphery of the hub, each hub slot having a hub slot surface, and furnishing a plurality of rotor blades. Each rotor blade includes an airfoil, and a root at one end of the airfoil, with the root being shaped and sized to be received in one of the hub slots of the rotor disk. A protective coating is deposited by a wire spray process at a location which will be, upon assembly, disposed between the root of each rotor blade and the respective hub slot surface. The protective coating is a protective alloy having, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities. The rotor blades are assembled into the hub slots of the rotor disk to form the rotating structure, which is then operated at a temperature such that the root is at a temperature of from about 75° F. to about 350° F.

20 Claims, 6 Drawing Sheets

METHOD FOR PROVIDING A ROTATING STRUCTURE HAVING A WIRE-ARC-SPRAYED ALUMINUM BRONZE PROTECTIVE COATING THEREON

This invention relates to a gas turbine engine and, more particularly, to the prevention of wear damage between the rotor blades and the rotor disk in the compressor and fan sections of the engine.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The compressor and the bypass fan are both rotating structures in which blades extend radially outwardly from a rotor disk. In most cases, the blades are made of a different material than the rotor disk, so that they are manufactured separately and then affixed to the rotor disk. That is, compressor blades are manufactured and mounted to a compressor rotor disk, and fan blades are manufactured and mounted to a fan rotor disk.

In one approach that is widely used, each blade has an airfoil-shaped region and a root at one end thereof. The root is in the form of a dovetail structure. The rotor disk has corresponding hub slots therein. The dovetail structure of each root slides into its respective hub slot to affix the blade to the rotor disk.

When the gas turbine engine is operated, there is a high-frequency, low amplitude relative movement between the root and the surface of the hub slot. This movement produces wear damage, of a type typically termed "fretting wear", to the root or to the hub slot. The fretting wear may lead to the initiation of fatigue cracks which in turn lead to the need for premature inspections of the components, or in extreme cases may lead to failure.

This problem has long been a concern to aircraft engine manufacturers. A variety of anti-wear coatings have been developed. However, these coatings have not been entirely satisfactory for compressor and fan rotor applications. There is a need for a more suitable protective coatings. The present invention fulfills this need, and further provides related advantages.

BRIEF SUMMARY OF THE INVENTION

The present invention includes a method for providing a rotating structure of a gas turbine engine. The contact between the rotor disk and the rotor blades is protected by a protective coating that reduces friction and wear between these components. The result is an extended life without wear-based fatigue damage and failures.

A method for providing a rotating structure of a gas turbine engine comprises the steps of furnishing a rotor disk comprising a hub with a plurality of hub slots in a periphery of the hub. Each hub slot has a hub slot surface. A plurality of rotor blades are furnished, wherein each rotor blade comprises an airfoil, and a root at one end of the airfoil. The root is shaped and sized to be received in one of the hub slots of the rotor disk. A protective coating is deposited at a location which will be, upon assembly, disposed between the root of each rotor blade and the respective hub slot surface. The deposition is performed by a wire arc spray process, preferably a compressed-air wire arc spray process. The protective coating is a protective alloy comprising (preferably consisting essentially of), in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities. The protective coating is preferably from about 0.003 to about 0.020 inch thick. The roots of the rotor blades are assembled into the respective hub slots of the rotor disk to form the rotating structure.

The rotor disk may be a compressor disk, and the rotor blades are compressor blades. Alternatively, the rotor disk may be a fan disk, and the rotor blades are fan blades. Preferably, the hub of the rotor disk is made of a titanium alloy.

The protective coating may be deposited on the root, or on the hub slot surface, or both. Alternatively, the protective coating may be deposited on a shim that is subsequently positioned during assembly between the root and the hub slot surface.

The rotating structure is thereafter operated such that the root is at a temperature of from about 75° F. to about 350° F.

In a preferred form, a method for providing a rotating structure of a gas turbine engine comprises the steps of furnishing a set of rotor blades, with each rotor blade comprising an airfoil, and a root at one end of the airfoil. A protective coating having the protective alloy composition set forth above is deposited on the root of each rotor blade by a wire arc spray process. The rotor blades are assembled into the hub slots of the rotor disk and subsequently operated.

The present approach yields a low-friction, low-wear interface between the root of the blade and the hub slot surface of the rotor disk. The wire arc spray process produces good bonding between the protective coating and the substrate, with a relatively low-temperature deposition technique that does not overly heat the substrate or produce high differential thermal stresses between the substrate and the protective coating. The preferred compressed-air wire arc spray process has the additional advantage that no contaminants such as hydrocarbons are introduced into the deposited protective coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
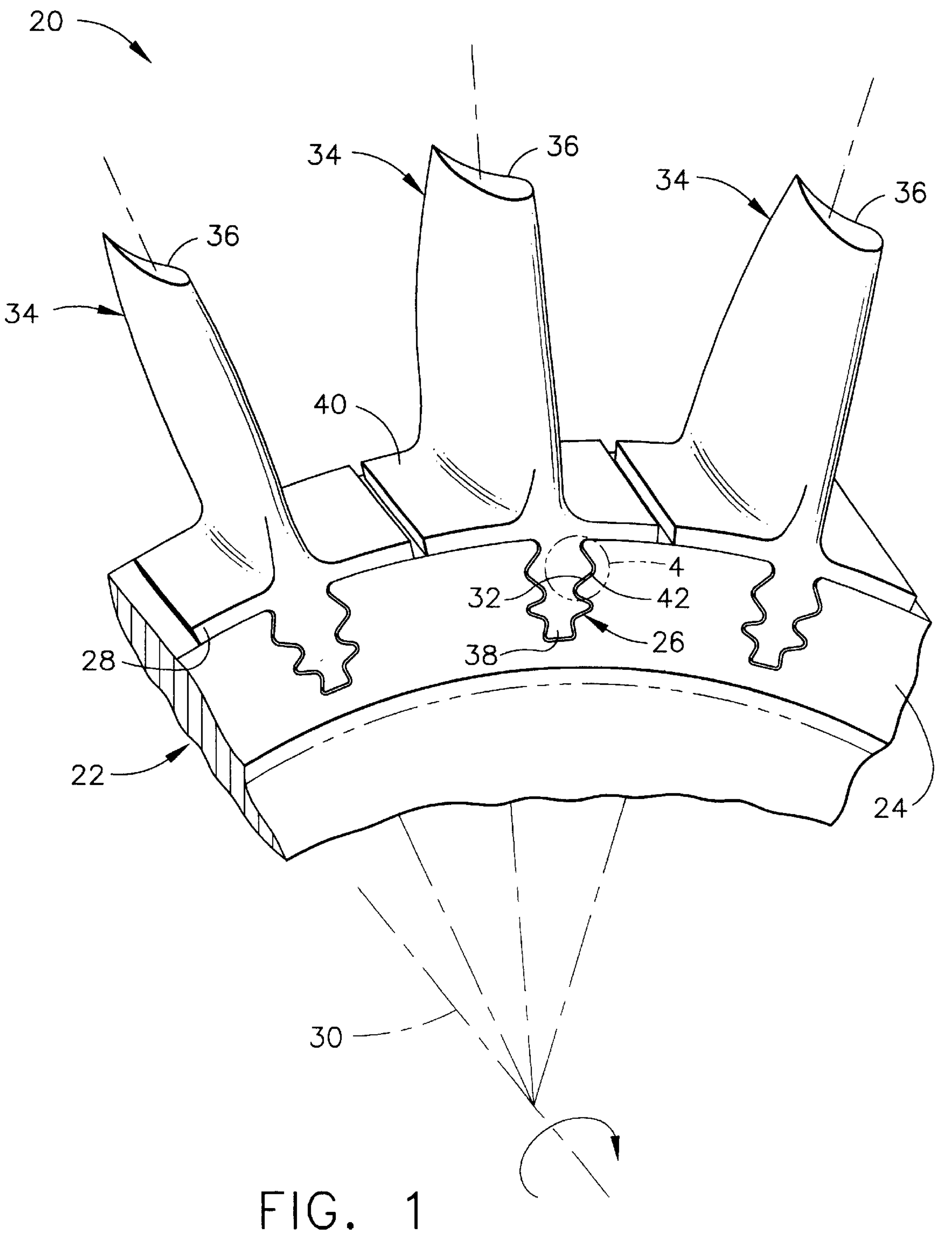
FIG. 1 is a perspective view of a portion of a rotor disk with rotor blades mounted thereto.

FIG. 1 depicts a rotating structure 20 of a gas turbine engine. The rotating structure 20 includes a rotor disk 22 having a hub 24 with a plurality of hub slots 26 in a periphery 28 of the hub 24. The rotor disk 22 rotates on a shaft (not shown) about a rotation axis 30. Each hub slot 26 has a hub slot surface 32. There are a plurality (three of which are illustrated in this segmented view) of rotor blades 34 extending around the periphery 28 of the hub 24, one for each hub slot 26. Each rotor blade 34 has an airfoil 36 which compresses air and pumps it axially through the gas turbine engine as the rotor disk 22 turns about the rotation axis 30, and a root 38 at one end of the airfoil 36. Typically, a transversely extending platform 40 separates the root 38 from the airfoil 36. The root 38 of each of the rotor blades 34 has a root surface 42 that is shaped and sized to be received in one of the hub slots 26 of the rotor disk 22. Most commonly, the root surface 42 has the illustrated shape, termed a "dovetail" or "fir tree" shape. During service when the gas turbine engine is operating, the root surface 42 rubs against the hub slot surface 32, leading to fretting wear and thence to roughening of the surfaces and possibly fatigue cracking, in the absence of an approach such as that discussed herein.

The rotor disk 22 may be a compressor disk, and the rotor blades 34 are compressor blades. The compressor disk and the compressor blades are typically made of titanium-base or nickel-base alloys. The rotor disk 22 may instead be a fan disk, and the rotor blades 34 are fan blades. The fan disk and the fan blades are typically made of titanium-base alloys.

Figure 2:
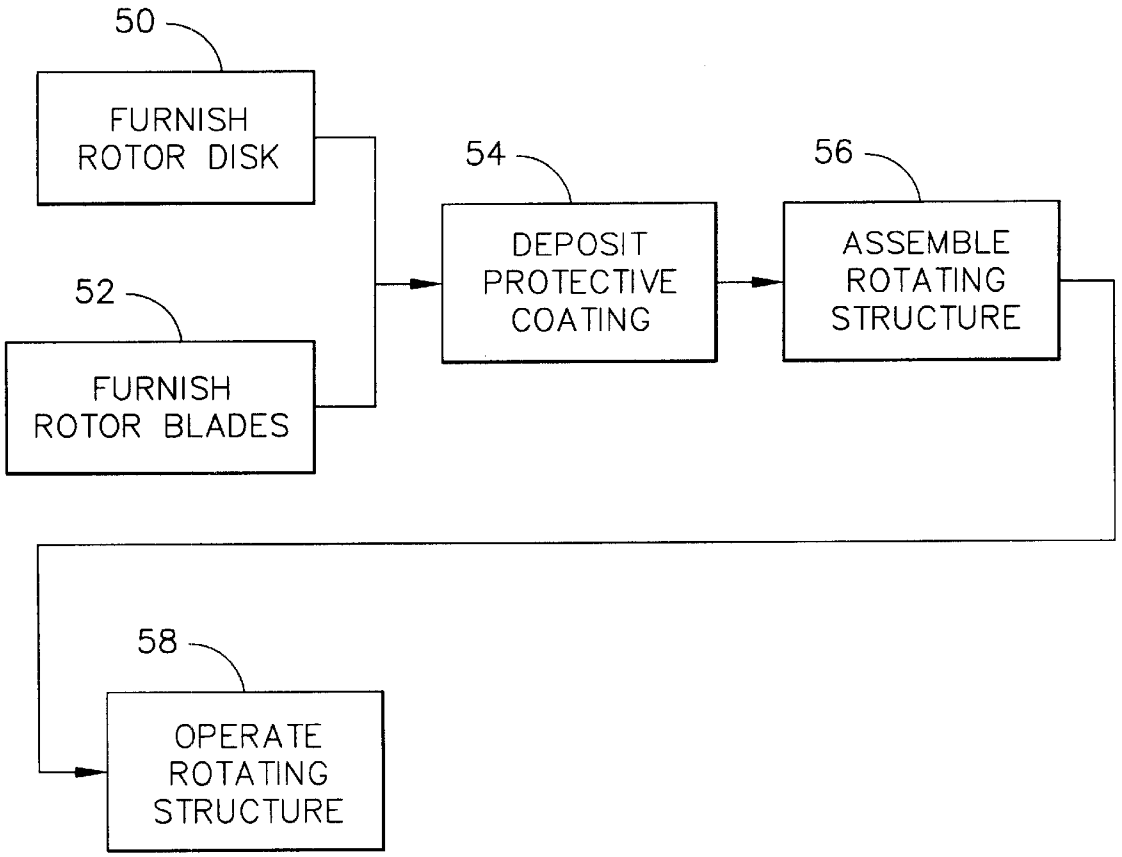
FIG. 2 is a block flow diagram of an approach for practicing the invention.

FIG. 2 shows a method for providing the rotating structure 20. The rotor disk 22 is furnished, step 50, and the rotor blades 34 (without a protective coating as described below) are furnished, step 52. Steps 50 and 52 are known in the art. A protective coating is deposited, step 54, at a location which will, upon assembly of the rotor blades 34 to the rotor disk 22, be disposed between the root 38 of each rotor blade 34 and the respective hub slot surface 32.

Figure 3:
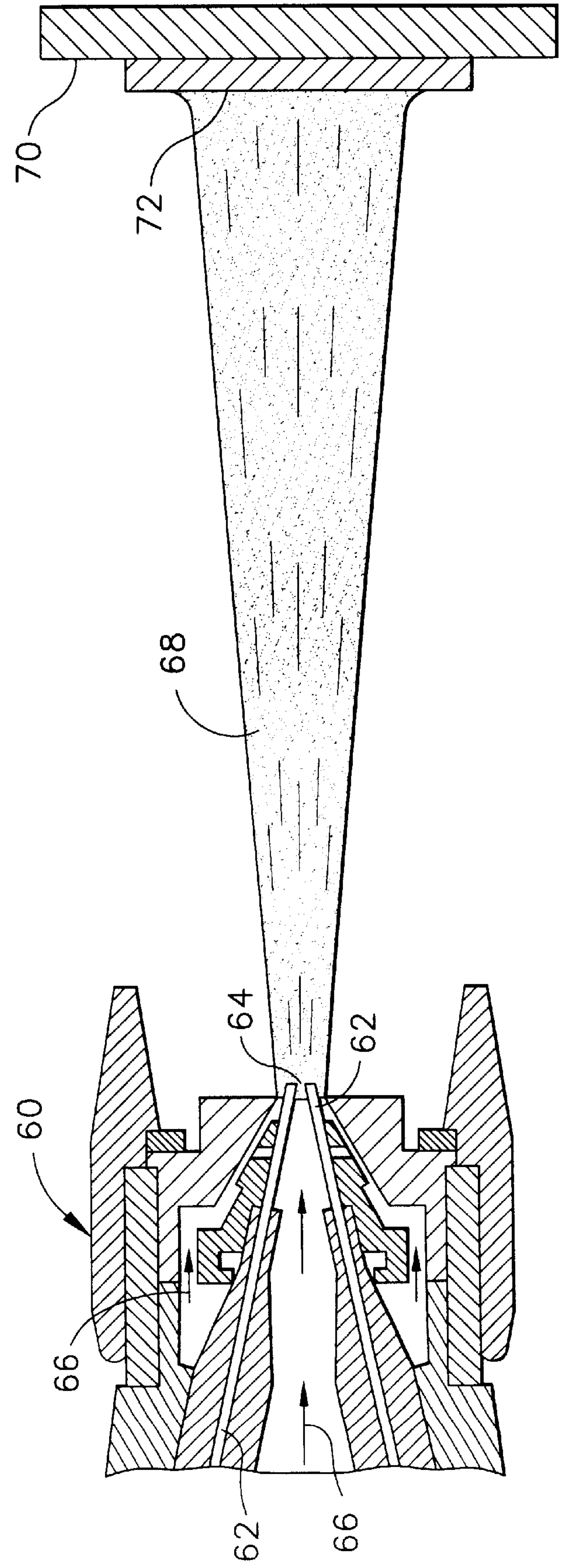
FIG. 3 is a schematic depiction of a wire arc spray apparatus.

The deposition 54 is accomplished by a wire arc spray process. Wire arc spray processes and apparatus are known in the art. FIG. 3 generally depicts a preferred form of the wire arc spray apparatus and its use. A spray apparatus 60 includes two continuously fed wire electrodes 62 of the material that is to be deposited and whose composition will be discussed subsequently. A voltage of from about 25 to about 35 volts is created between the two wire electrodes 62. A resulting arc 64 between the tips of the two wire electrodes 62 produces a plasma in this region. The wire electrodes 62 are melted by this plasma. A flow 66 of compressed gas, such as nitrogen, argon, hydrogen, or, preferably, air, flows through this arc 64 and propels the droplets of molten metal as a jet 68 against a substrate 70, depositing a coating 72 of the metal of the wire electrodes 62 on the substrate 68.

The wire arc spray process and apparatus 60 have important features that produce a highly desirable coating 70 on the substrate 68. The arc 64 is struck between the two wire electrodes 62 (or between the wire and a cathode within the apparatus in other forms of the wire arc spray apparatus) and the hot arc is formed within the spray apparatus 60. In many other thermal spray processes, an arc is struck between the spray apparatus and the substrate, so that a plasma is formed and much of the energy consumed by the apparatus is used to heat the substrate. In the present case, the arc and its energy preferably remain within the spray apparatus 60 itself. The present approach uses only about ⅛ of the energy used by other thermal spray processes, a desirable feature for process economics. From the standpoint of the part being coated (i.e., the substrate 70) and the coating 72 itself, there is less heating of the part being coated so that it stays at a lower temperature than is the case for other approaches. The coating 72 experiences less of a differential thermal strain upon cooling, because the substrate is not heated to as high a temperature as used for other thermal spray processes such as plasma spray (air or vacuum), physical vapor deposition, high velocity oxyfuel (HVOF) deposition, and D-gun (detonation gun).

Additionally, when the wire arc spray process uses only compressed air, nitrogen, or other gas that does not ignite, as distinct from a hydrocarbon gas or hydrogen or the like, there is a reduced likelihood of the formation of undesirable phases in the deposited coating. The deposition of coatings by the wire arc spray process is inexpensive as compared with other techniques. There are fewer control variables in the wire arc spray process, and it is safer to operate than alternative approaches.

In the present approach, the wire electrodes 62 are made of a protective alloy, and this same protective alloy is deposited as the coating 72. The protective alloy comprises, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities. Preferably, the protective alloy consists essentially of, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities. This alloy, termed an aluminum bronze, provides protection for the surfaces 42 and 32.

The composition of the protective alloy may not be substantially outside of these compositional limits. The compositional limits are selected cooperatively to yield the desirable properties that will be discussed subsequently, particularly in relation to FIGS. 7–10.

Figure 4:
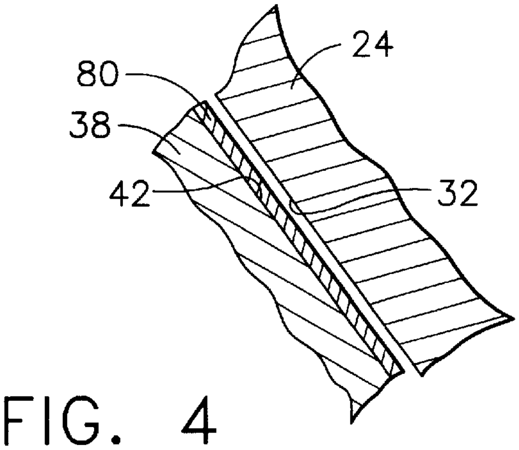
FIG. 4 is a detail of the region of the root and the hub slot of FIG. 1, taken in region 4 and showing a first embodiment of the invention.
Figure 5:
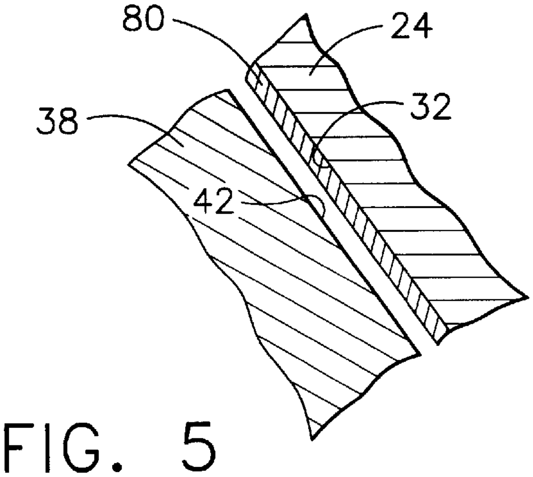
FIG. 5 is a detail like that of FIG. 4, showing a second embodiment of the invention.
Figure 6:
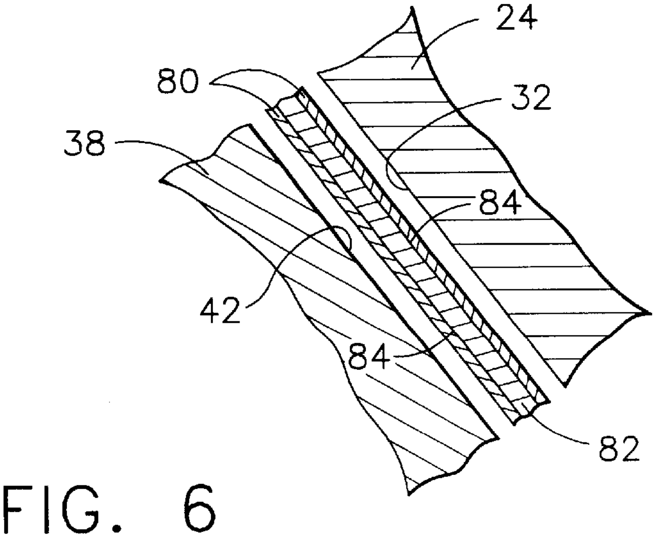
FIG. 6 is a detail like that of FIG. 4, showing a third embodiment of the invention.

FIGS. 4–6 depict three embodiments of interest for the application of a protective coating 80 of the protective alloy. In FIGS. 4–6, the separation between the root 38 and the hub 24 is exaggerated, so that the locations of the protective coating and the other elements may be seen clearly. After assembly, the various elements are much more closely spaced, and usually are contacting each other. In the approach of FIG. 4, the protective coating 80 is deposited upon the root surface 42. This approach is preferred, because the deposition may be accomplished more easily and uniformly than in the case wherein the protective coating 80 is applied inside the hub slot onto the hub slot surface 32, as in FIG. 5. In the approach of FIG. 6, a shim 82 is provided and coated on one or both shim surfaces 84 with the protective coating 80. The shim 82 may be made of a different material than the root 38 and than the hub 24.

In each case, the protective coating 80 is preferably from about 0.003 to about 0.020 inch thick. If the coating is too thin, the coating structure breaks down. If the coating is too thick, the cohesive strength between the coating and the substrate is unacceptably reduced.

After the protective coating 80 is deposited, step 54 of FIG. 2, the rotating structure 20 is assembled, step 56. In assembly, the root 38 of each rotor blade 34 is slid into the respective hub slot 26. The protective coating 80 is located between the hub slot surface 32 and the root surface 42.

The rotating structure 20 is thereafter assembled with the remainder of the gas turbine engine and operated under service conditions, step 58. In the present case, the service temperature of the root 38 is typically from about 75° F. to about 350° F. The lowest root service temperatures are found in the bypass fans, while higher service temperatures are found in the compressor stages. The temperatures of the roots 38 become successively higher for the higher pressure compressor stages. The present approach is particularly effective for articles to be used within this temperature range.

The present approach has been reduced to practice and evaluated in comparative testing with an approach where a protective layer of 10 weight percent, balance copper (10 percent aluminum bronze) was applied by a plasma spray. In each case, the substrate was shot-peened titanium-6 aluminum-4 vanadium (by weight) alloy.

Figure 7:
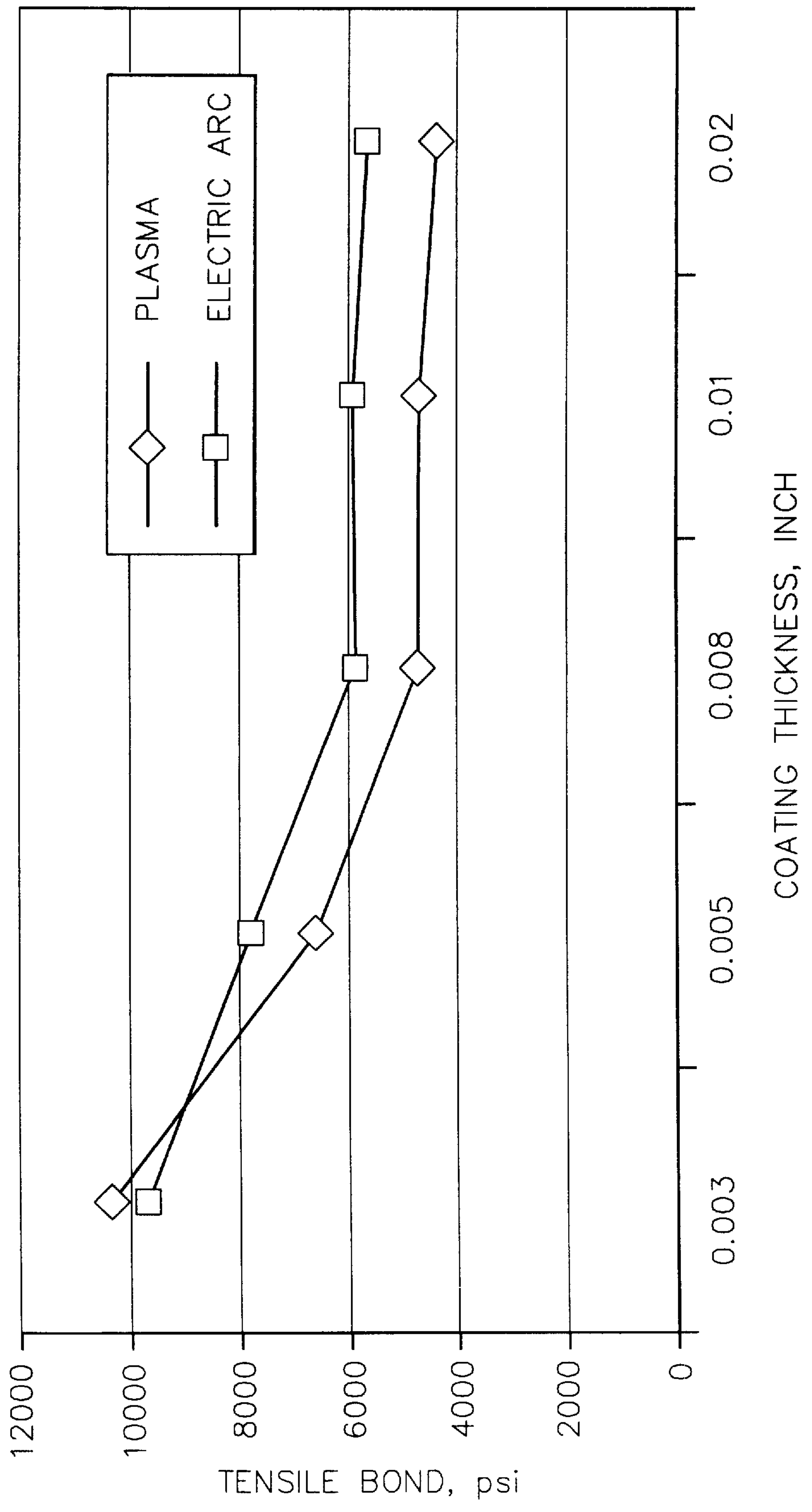
FIG. 7 is a graph of tensile strength as a function of thickness, for the bond between the protective coating and the substrate, for the present approach and for a first prior approach.
Figure 8:
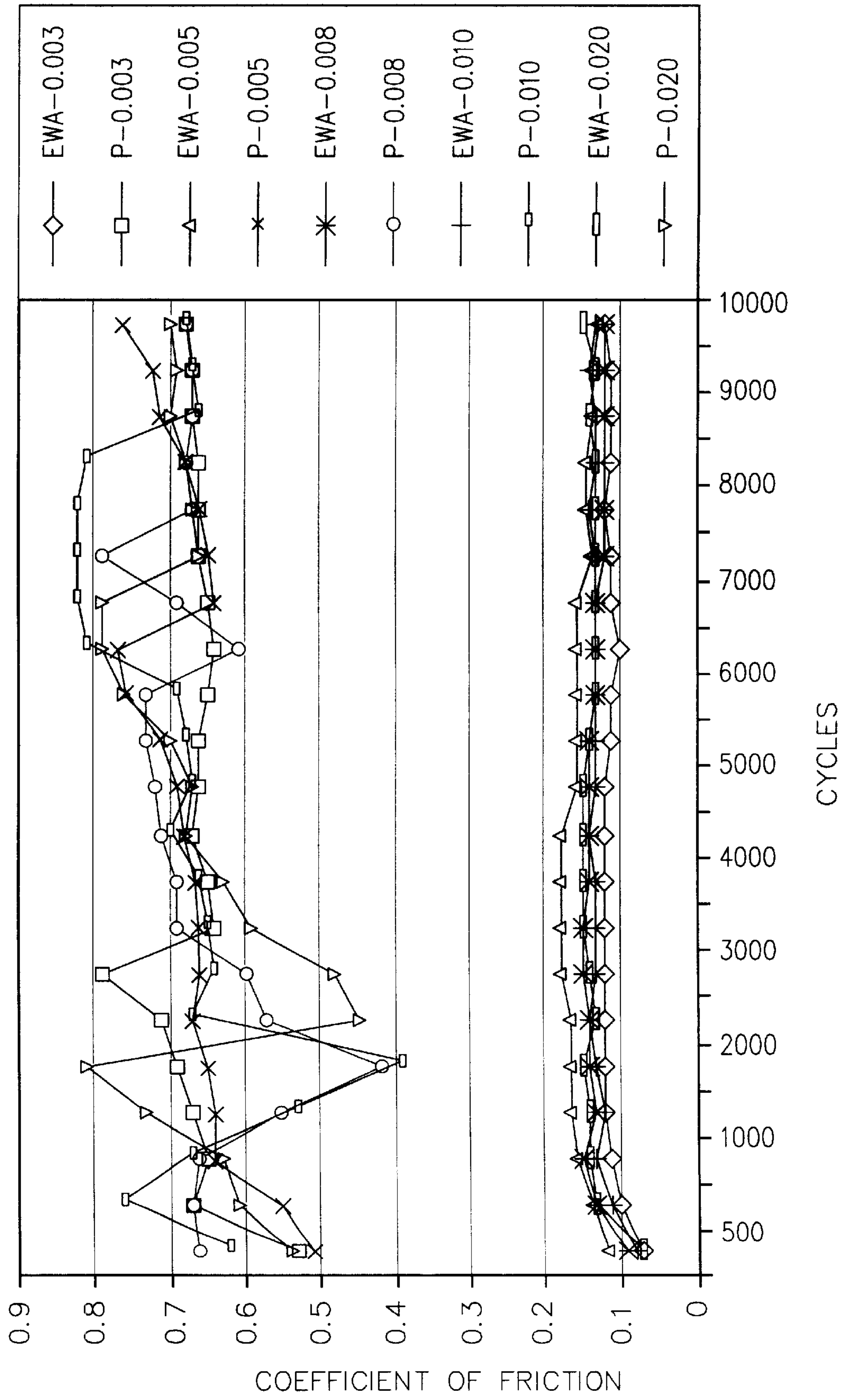
FIG. 8 is a graph of coefficient of friction as a function of number of cycles of wear, for the protective coating of the present approach and for the first prior approach.

FIGS. 7–8 illustrate comparative test results. As seen in FIG. 7, the bond between the protective coating 80 of the present composition and deposition technique, and the substrate 70 to which it is applied, is stronger than that produced between a 10 percent aluminum bronze (copper-10 weight percent aluminum, and small amounts of other elements) protective coating and the substrate for a plasma-sprayed deposition approach.

FIG. 8 presents the coefficient of friction of the respective coatings as a function of the number of cycles of wear. (In the legend for FIG. 8, EWA or "electric wire arc" refers to the present approach, and P refers to plasma spray. The number in each legend is the coating thickness in thousandths of an inch, e.g., 0.003 means 0.003 inches thick.) In each case, the substrate was shot-peened titanium-6 aluminum-4 vanadium (by weight) alloy. The contact pressure was 135,000 pounds per square inch, the sliding stroke was 0.009 inches, and the frequency of the stroke was 60 cycles per minute. No lubricant was used. The specimens prepared using the present approach had a uniformly low coefficient of friction of 0.1–0.2 that was maintained for extended numbers of cycles. The specimens prepared using the 10 percent aluminum bronze and plasma spray had much higher coefficients of friction, which varied considerably during the course of the testing.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for providing a rotating structure of a gas turbine engine comprising the steps of:

furnishing a rotor disk comprising a hub with a plurality of hub slots in a periphery of the hub, each hub slot having a hub slot surface;

furnishing a plurality of rotor blades, wherein each rotor blade comprises an airfoil, and a root at one end of the airfoil, the root being shaped and sized to be received in one of the hub slots of the rotor disk;

depositing a protective coating at a location which will be, upon assembly, disposed between the root of each rotor blade and the respective hub slot surface by a wire arc spray process, the protective coating being a protective alloy comprising, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities; and assembling the roots of the rotor blades into the respective hub slots of the rotor disk to form the rotating structure.

2. The method of claim 1, wherein the step of furnishing the rotor disk includes the step of furnishing a compressor disk, and wherein the step of furnishing the rotor blades includes the step of furnishing compressor blades.

3. The method of claim 1, wherein the step of furnishing the rotor disk includes the step of furnishing a fan disk, and wherein the step of furnishing the rotor blades includes the step of furnishing fan blades.

4. The method of claim 1, wherein the step of providing the rotor disk includes the step of furnishing the hub made of a titanium alloy.

5. The method of claim 1, wherein the step of depositing the protective coating includes the step of depositing the protective coating wherein the protective alloy consists essentially of, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities.

6. The method of claim 1, wherein the step of depositing the protective coating includes the step of depositing the protective coating on the root.

7. The method of claim 1, wherein the step of depositing the protective coating includes the step of depositing the protective coating on the hub slot surface.

8. The method of claim 1, wherein the step of depositing the protective coating includes the steps of furnishing a shim sized to be positioned between the root and the hub slot surface, and depositing the protective coating on a surface of the shim.

9. The method of claim 1, wherein the step of depositing the protective coating includes the step of spraying the protective coating using a compressed-air wire arc spray process.

10. The method of claim 1, wherein the step of depositing the protective coating includes the step of depositing the protective coating in a thickness of from about 0.003 to about 0.020 inch.

11. The method of claim 1, including an additional step, after the step of assembling, of operating the rotating structure such that the root is at a temperature of from about 75° F. to about 350° F.

12. A method for providing a rotating structure of a gas turbine engine comprising the steps of:

furnishing a set of rotor blades, each rotor blade comprising an airfoil, and a root at one end of the airfoil; and depositing a protective coating on the root of each rotor blade by a wire arc spray process, the protective coating being a protective alloy comprising, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities.

13. The method of claim 12, including an additional step, after the step of depositing the protective coating, of assembling the roots of the rotor blades into a set of slots on a hub of a rotor disk to form a rotating structure.

14. The method of claim 13, including an additional step, after the step of assembling, of operating the rotating structure such that the root is at a temperature of from about 75° F. to about 350° F.

15. The method of claim 13, wherein the step of assembling includes the step of furnishing the hub made of a titanium alloy.

16. The method of claim 12, wherein the step of furnishing a set of rotor blades includes the step of furnishing compressor blades.

17. The method of claim 12, wherein the step of furnishing a set of rotor blades includes the step of furnishing fan blades.

18. The method of claim 12, wherein the step of depositing the protective coating includes the step of depositing the protective coating wherein the protective alloy consists essentially of, in weight percent, from about 6.0 to about 8.5 percent aluminum, from 0 to about 0.5 percent manganese, from 0 to about 0.2 percent zinc, from 0 to about 0.1 percent silicon, from 0 to about 0.1 percent iron, from 0 to about 0.02 percent lead, remainder copper and impurities.

19. The method of claim 12, wherein the step of depositing the protective coating includes the step of spraying the protective coating using a compressed-air wire arc spray process.

20. The method of claim 12, wherein the step of depositing the protective coating includes the step of depositing the protective coating in a thickness of from about 0.003 to about 0.020 inch.

* * * * *